United States Patent
Bullard et al.

(10) Patent No.: US 10,076,123 B1
(45) Date of Patent: Sep. 18, 2018

(54) METHOD FOR REDUCTION IN MICROBIAL ACTIVITY IN RED MEAT

(71) Applicant: Zeco, Inc., Chattanooga, TN (US)

(72) Inventors: Robert C. Bullard, Signal Mountain, TN (US); Battle Glascock, Soddy Daisey, TN (US); James A. Faller, Chattanooga, TN (US); Jonathon R. Bullard, Chattanooga, TN (US)

(73) Assignee: Zeco, Inc., Cattanooga, TN (US)

( * ) Notice: Subject to any disclaimer, the term of this patent is extended or adjusted under 35 U.S.C. 154(b) by 0 days.

(21) Appl. No.: 15/047,014

(22) Filed: Feb. 18, 2016

Related U.S. Application Data

(60) Provisional application No. 62/118,021, filed on Feb. 19, 2015.

(51) Int. Cl.
  *A23L 3/3454* (2006.01)
  *A23B 4/12* (2006.01)
  *A23B 4/005* (2006.01)

(52) U.S. Cl.
  CPC .............. *A23B 4/12* (2013.01); *A23B 4/005* (2013.01); *A23V 2002/00* (2013.01)

(58) Field of Classification Search
  CPC ........ A23B 4/12; A23B 4/005; A23V 2002/00
  USPC .................... 426/335, 641, 647, 520
  See application file for complete search history.

(56) References Cited

U.S. PATENT DOCUMENTS

| | | |
|---|---|---|
| 5,069,922 A | 12/1991 | Brotsky et al. |
| 5,143,739 A | 9/1992 | Bender et al. |
| 5,200,189 A | 4/1993 | Oakes et al. |
| 5,234,703 A | 8/1993 | Guthery |
| 5,314,687 A | 5/1994 | Okaes et al. |
| 5,364,650 A | 11/1994 | Guthery |
| 5,409,713 A | 4/1995 | Lokkesmoe et al. |
| 5,427,868 A | 6/1995 | Bringley et al. |
| 5,435,808 A | 7/1995 | Holzhauer et al. |
| 5,489,434 A | 2/1996 | Oakes et al. |

(Continued)

FOREIGN PATENT DOCUMENTS

| | | |
|---|---|---|
| GB | 947688 | 1/1964 |
| JP | 2009506771 A | 2/2009 |

(Continued)

OTHER PUBLICATIONS

Mohan et al. "Role of Peroxyacetic Acid, Octanoic Acid, Malic Acid, and Potassium Lactate on the Microbiological and Instrumental Color Characteristics of Ground Beef", J. Food Science, vol. 77, No. 4, 2012, pp. M188-M193.

(Continued)

*Primary Examiner* — Helen F Heggestad
(74) *Attorney, Agent, or Firm* — Patterson Thuente Pedersen, P.A.

(57) ABSTRACT

A process for reducing the bacterial count on a red meat carcass during the processing of livestock, such as bovine or swine, by applying an intervention solution having at least one equilibrium peroxycarboxylic acid or a pH modified peroxycarboxylic acid comprising peroxyacetic acid to the red meat carcass at an elevated temperature above 100° F. and at a concentration of at least 10 ppm, preferably an elevated concentration of at least 200 ppm, for a desired period of time of less than about 60 seconds, preferably less than about 30 seconds, to reduce the bacterial count by at least 60 percent.

18 Claims, 1 Drawing Sheet

(56) References Cited

U.S. PATENT DOCUMENTS

| | | | |
|---|---|---|---|
| 5,632,676 A | 5/1997 | Kurschner et al. | |
| 5,635,231 A | 6/1997 | Bender et al. | |
| 5,683,724 A | 11/1997 | Hei et al. | |
| 6,010,729 A | 1/2000 | Gutzmann et al. | |
| 6,103,286 A | 8/2000 | Gutzmann et al. | |
| 6,113,963 A | 9/2000 | Gutzmann et al. | |
| 6,183,807 B1 | 2/2001 | Gutzmann et al. | |
| 6,514,556 B2 | 2/2003 | Hilgren et al. | |
| 6,545,047 B2 | 4/2003 | Gutzmann et al. | |
| 6,627,593 B2* | 9/2003 | Hei | A01N 37/16 424/405 |
| 6,674,538 B2 | 1/2004 | Takahashi | |
| 6,767,569 B1 | 7/2004 | Marsden et al. | |
| 6,828,294 B2 | 12/2004 | Kellar et al. | |
| 6,964,788 B2 | 11/2005 | Phebus et al. | |
| 7,163,709 B2 | 1/2007 | Cook et al. | |
| 7,192,618 B2 | 3/2007 | Cummins et al. | |
| 7,357,949 B2 | 4/2008 | Trogolo et al. | |
| 7,754,670 B2 | 7/2010 | Lange et al. | |
| 7,887,641 B2 | 2/2011 | Man et al. | |
| 8,020,520 B2 | 9/2011 | Hilgren et al. | |
| 8,029,693 B2 | 10/2011 | Dada et al. | |
| 8,030,351 B2 | 10/2011 | Gutzmann et al. | |
| 8,043,650 B2* | 10/2011 | Gutzmann | A01N 37/16 426/652 |
| 8,080,269 B2 | 12/2011 | Burwell et al. | |
| 8,128,976 B2 | 3/2012 | Man et al. | |
| 8,586,115 B2 | 11/2013 | Burwell et al. | |
| 2003/0211169 A1 | 11/2003 | Tabasso | |
| 2005/0084471 A1 | 4/2005 | Andrews et al. | |
| 2006/0030505 A1* | 2/2006 | Biering et al. | |
| 2006/0113506 A1 | 6/2006 | Man et al. | |
| 2007/0269536 A1 | 11/2007 | Bailey et al. | |
| 2007/0269563 A1 | 11/2007 | Mixon et al. | |
| 2009/0043123 A1 | 2/2009 | Copenhafer et al. | |
| 2009/0145859 A1 | 6/2009 | Man et al. | |
| 2009/0192165 A1 | 7/2009 | Burwell et al. | |
| 2010/0196503 A1 | 8/2010 | Heisig et al. | |
| 2010/0227000 A1 | 9/2010 | Ames et al. | |
| 2011/0027383 A1 | 2/2011 | Hilgren et al. | |
| 2011/0135534 A1 | 6/2011 | Bates et al. | |
| 2011/0177145 A1 | 6/2011 | Erkenbrecher, Jr. et al. | |
| 2011/0220155 A1 | 9/2011 | Man et al. | |
| 2011/0305805 A1 | 12/2011 | Gutzmann et al. | |
| 2011/0311691 A1 | 12/2011 | Gutzmann et al. | |
| 2012/0244261 A1 | 9/2012 | Harvey et al. | |
| 2012/0245228 A1 | 9/2012 | Harvey et al. | |
| 2012/0264758 A1 | 10/2012 | Burwell et al. | |
| 2013/0203849 A1 | 8/2013 | Ben Yehuda | |
| 2014/0011875 A1* | 1/2014 | Harvey | C11D 3/3947 514/557 |

FOREIGN PATENT DOCUMENTS

| | | |
|---|---|---|
| WO | WO 99/00025 | 1/1999 |
| WO | WO 02/054866 A1 | 7/2002 |
| WO | WO 2007/030104 A1 | 3/2007 |
| WO | WO 2007/091996 A1 | 8/2007 |
| WO | WO 2007/145783 A2 | 12/2007 |
| WO | WO 2009/027857 A1 | 3/2009 |

OTHER PUBLICATIONS

Quilo et al., "Microbial, instrumental color and sensory characteristics of inoculated ground beef produced using potassium lactate, sodium metasilicate or peroxyacetic acid as multiple antimicrobial interventions", Meat Science, 84, 2010, pp. 470-476.

Harris et al., "Microbiological and organoleptic characteristics of beef trim and ground beef treated with acetic acid, lactic acid, acidified sodium chlorite, or sterile water in a simulated commercial processing environment to reduce *Escherichia coil* 0157:H7 and *Salmonella*", Meat Science, 90, 2012, pp. 783-788.

Bell, "Reduction of doodborne mirco-organisms on beef carcass tissue using acetic acid, sodium bicarbonate, and hydrogen peroxide spray washes", Food Microbiology (1997), 14, 439-448.

Labadie, "Development of a New Technique for Obtaining Axenic Meat", European J. Appl. Microbiol. (1977), 4, 67-73.

Gusev, "Peracetic Acid for Salmonella Decontamination in Poultry Carcasses", Veterinary Disease Control Review (2007), 4 pages.

Dorn, "Examination of *Salmonella* Decontamination of Broiler Carcasses", (1988), 28 pages.

Joseph, "Meat Decontamination", University of Bristol (1997), pp. 1, 8-9, 12, 33-35, 38, 43, 64-91, 98-99 and 104-105.

* cited by examiner

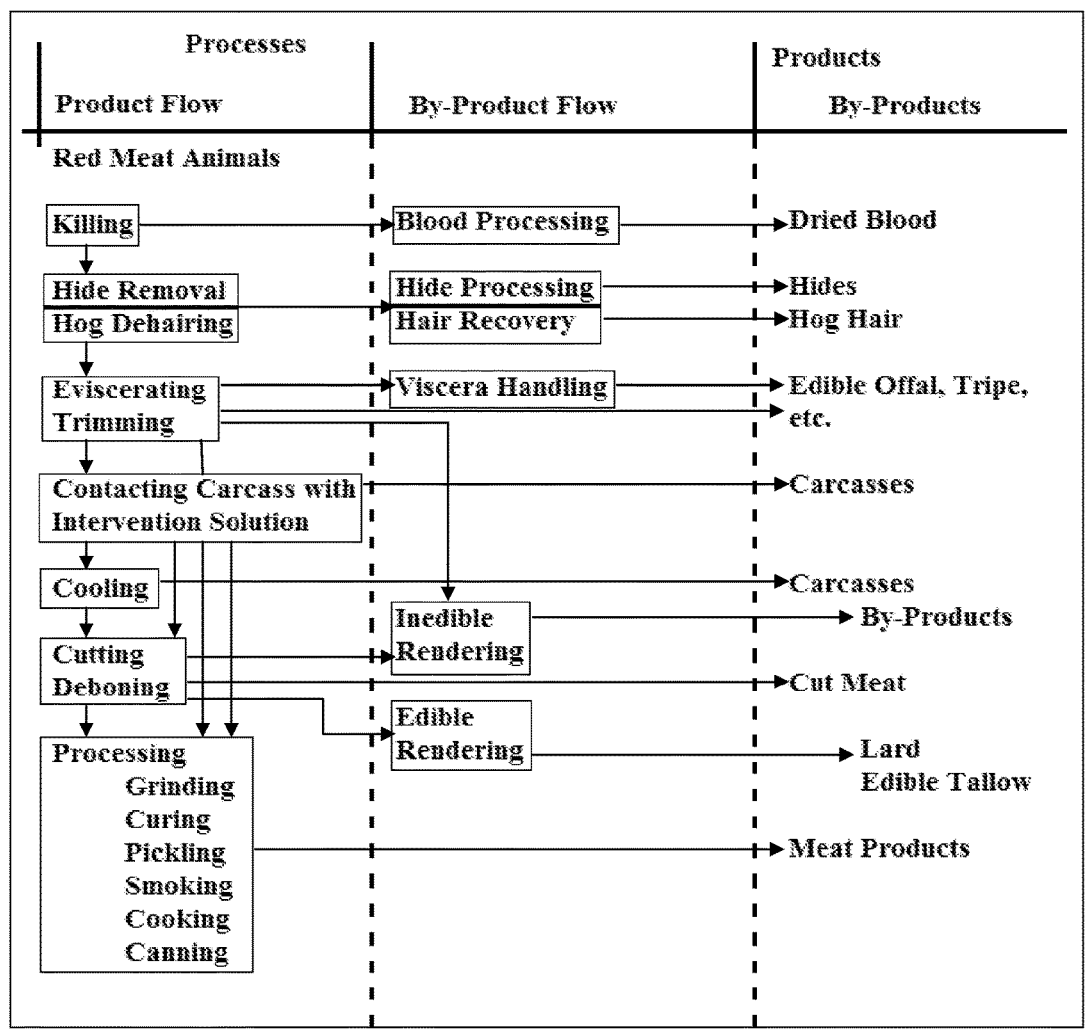

METHOD FOR REDUCTION IN MICROBIAL ACTIVITY IN RED MEAT

CROSS-REFERENCE TO RELATED APPLICATION

The present application claims the benefit of U.S. Provisional Application No. 62/118,021, filed Feb. 19, 2015, which is hereby incorporated herein in its entirety by reference.

FIELD OF THE INVENTION

The present invention relates to a method of reducing the bacterial count on red meat during processing by exposing the red meat to a solution comprising a peroxycarboxylic acid at an elevated concentration and temperature, more particularly soaking, dipping, quenching, rinsing, spraying and/or washing the red meat in a solution comprising a peroxycarboxylic acid at an elevated concentration and temperature, the peroxycarboxylic acid preferably comprising peroxyacetic acid, and more particularly an equilibrium peroxycarboxylic acid solution, and more preferably a pH modified peroxycarboxylic acid solution.

BACKGROUND OF THE INVENTION

The world population has grown to point where mass production of the foods that we consume is no longer a luxury but a requirement. Local farmers, providing food and food products directly to the marketplace, cannot meet the demands of modern society. The food supply chain now incorporates very large, complex farms and high speed and very high volume processing plants to satisfy the need for mass processing and production of food. Maintaining a safe food supply chain relies on the dedication of those working in the supply chain, the processing plants and also on the third party oversight of various Federal agencies whose regulations support and mandate food safety.

With two major exceptions, the physical process of taking an animal from the farm to the consumer has changed very little over time. The introduction of refrigeration, and the implementation of various chemistries to help maintain sanitary conditions and to control microbiology, has given modern food processors an advantage not enjoyed by food producers of a century ago. Refrigeration and chemical intervention practices have become an integral part of food processing facility operations. These technologies have enabled the high speed, high volume output of the large processing facilities that could not have been possible in times past without significant concern for consumer safety. With large scale and continuous processing methods being employed by large processors of protein products, or any other product that is susceptible to microbiological contamination, the concern for the control of microbiology and the safety of the food supply chain is of paramount importance.

Another concern, as the demand for food products increases, is the impact on natural resources created by this demand. The ecological impact is directly affected by this growth and therefore new processes must be developed to reduce the impact any given process has on the environment. The ecological impact that a food processing plant has on the environment is no longer a passing concern but a major part of operations and planning. Entire processes are built around the control and conservation of natural resources such as water. Older, outdated and less efficient processes are being replaced at significant cost with more efficient and less wasteful processes that maximizes the utility of available resources. No longer can a plant operate without concern for the conservation and sustainability of natural resources. As each step in food processing becomes more efficient, the natural resources required to be used in subsequent steps can be minimized to conserve and sustain our natural resources.

Still another concern in slaughtering and processing plants is unwanted microorganisms that are emitted into the air or are contained on the animal carcass when the animal is processed, such as red meat (i.e., beef, pork, etc.) and poultry (i.e., turkey, duck and chicken) during shackling, killing, scalding, and picking areas. The microorganisms that may become airborne or contained on the animal carcass are unwanted in the processing and packing areas of the plant because they can affect product quality and safety. They also pose a potential threat to the health and well-being of the workers in the plant. Still further, such microorganisms can affect down-field processes in a processing plant, posing quality and safety concerns to the ultimate consumer of the poultry product.

To insure that the food supply chain in modern society is maintained at the highest levels of safety for the consumer, the plant's employees, and the overall environment, there are federal agencies that monitor the processors operations so that a continually safe food supply is assured and the environmental impact and utilization of natural resources is as safe and efficient as possible. Modern food processing methods are scrutinized by government agencies to ensure compliance with safe handling and processing guidelines designed to minimize issues of food safety in the supply chain Regulations and routine inspections of systems and processes by Federal agencies such as the USDA, EPA and OSHA, mandate a government-industry alliance that helps ensure that every effort is made to deliver the safest food product possible to the consumer.

Very innovative approaches to the systems and methods used in processing facilities have been implemented to create profits for industry while maintaining low consumer cost of the final product. As new processes are developed, the federal agencies that have jurisdiction over any particular process are called upon to review the new approach and to ensure that the new innovation meets the current guidelines for safety. The higher the processors output, the higher the risk of microbiological contamination, and therefore the more innovative the processor must be to combat this ever present threat to the food chain safety. As new risks are found, federal guidelines become more stringent.

The use of antimicrobial agents on red meat has been implemented to control microbial growth. For example, an equilibrium solution of a peroxyacetic acid-based antimicrobial can be applied directly to red meat carcasses, parts and organs at room temperature to help reduce contamination of pathogenic bacteria, *Escherichia coli, Salmonella typhimurium* and *Listeria monocytogenes*, as well as other bacteria that may result in product spoilage or decay. There are several other antimicrobials that are approved and somewhat effective for use in the processing of red meat carcasses, parts and organs to decrease pathogens, including, for instance, chlorine, peroxyacetic acid ("PAA"), organic acids, trisodium phosphate ("TSP"), acidified sodium chlorite ("ASC") and chlorine dioxide.

PAA, which is also sometimes called peracetic acid or peroxyacetic acid, is a peroxycarboxylic acid and is a well known chemical for its strong oxidizing potential, has the molecular formula $CH_3COOOH$, and has a molecular structure as follows:

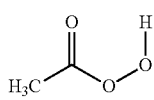

An equilibrium peroxyacetic acid solution is produced from an equilibrium mixture of hydrogen peroxide, acetic acid and water ("equilibrium PAA solution"), which often uses an acid catalyst, e.g., sulfuric acid.

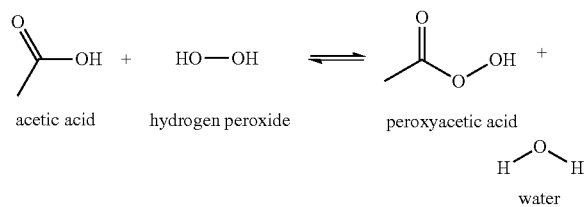

U.S. Pat. No. 5,632,676, which pertains to the application of equilibrium PAA solutions to fowl at an application concentration of about 100 ppm to about 2000 ppm, discloses such equilibrium solutions having a pH around 3.

As such, there is a need in the industry to efficiently and cost-effectively reduce microbial contamination of red meat carcasses, parts and organs during processing.

SUMMARY OF THE INVENTION

In some aspects of the present invention, a method for the reduction in microbial activity in protein food products intended for human consumption comprises contacting the protein food products with a solution comprising a peroxycarboxylic acid at an elevated concentration and elevated temperature for a desired period of time.

In some aspects of the present invention, the method for the reduction in microbial activity in protein food products intended for human consumption comprises contacting a red meat carcass, parts and/or organs, with a solution comprising a peroxycarboxylic acid at an elevated concentration and elevated temperature for a desired period of time. While the following disclosure refers to a red meat carcass, it should be appreciated that the disclosure is equally applicable to more than one red meat carcass, as well as, one or more red meat parts and/or organs, such that the reference to red meat carcass includes red meat parts and/or organs.

In some aspects, the red meat carcass is soaked, dipped, quenched, rinsed and/or washed after slaughter, hide removal (cattle) or dehairing (hogs) and the evisceration and trimming steps, in a solution comprising a peroxycarboxylic acid at an elevated concentration and elevated temperature for a desired period of time. In some aspects, the peroxycarboxylic acid comprises between about 2 to 12 carbon atoms, and in some aspects comprises peroxyacetic acid. In some aspects, the red meat carcass is soaked, dipped, quenched, rinsed and/or washed after the evisceration and trimming stage. In some aspects, the peroxycarboxylic acid is an equilibrium peroxycarboxylic acid solution, while in some other aspects the peroxycarboxylic acid is a pH modified peroxycarboxylic acid solution.

In some aspects, the red meat carcass is dipped in an intervention solution after the evisceration and trimming stage and prior to any chilling stage, said intervention solution at an elevated temperature and elevated concentration for desired period of time, wherein said elevated concentration of the intervention solution is between about 10 ppm and about 5000 ppm, in some aspects between about 100 ppm and about 2500 ppm, in some aspects between about 250 ppm and about 1500 ppm, in some aspects between about 300 ppm and about 1000 ppm, and in some other aspects between about 350 ppm and about 750 ppm.

In some aspects, the red meat carcass is dipped in an intervention solution after the evisceration and trimming steps and prior to the chilling stage, said intervention solution at an elevated temperature and elevated concentration for desired period of time, wherein the intervention solution comprises an equilibrium peroxycarboxylic acid. In some aspects, the equilibrium peroxycarboxylic acid has a pH above about 3.0 and below about 7.0, in certain aspects a pH range of about 3.5 to about 5.5, and in some other aspects a pH range of about 3.5 to about 5.0. In certain preferred aspects of the present invention, the equilibrium peroxycarboxylic acid comprises peroxyacetic acid.

In some aspects, the red meat carcass is dipped in an intervention solution after the evisceration and trimming stage, said intervention solution at an elevated temperature and elevated concentration for desired period of time, wherein the intervention solution comprises a pH modified peroxycarboxylic acid. In some aspects, the pH modified peroxycarboxylic acid has a pH above about 7.0 and below about 10.0, in certain aspects a pH range of about 7.0 to about 9.5, and in some other aspects a pH range of about 7.5 to about 9.0. In certain preferred aspects of the present invention, the pH modified peroxycarboxylic acid comprises peroxyacetic acid.

In certain aspects of the present invention, the pH modified peroxycarboxylic acid is prepared using at least one buffering agent, said at least one buffering agent chosen from sodium hydroxide, potassium hydroxide, sodium salts of carbonic acid, potassium salts of carbonic acid, phosphoric acid, silicic acid and combinations thereof.

In some aspects, the red meat carcass is dipped in an intervention solution after the evisceration and trimming stage and prior to the chilling stage, wherein said intervention solution at an elevated temperature and elevated concentration for a desired period of time, wherein the elevated temperature is between about 100° F. and about 150° F., in certain aspects between about 110° F. and about 140° F., in certain aspects between about 115° F. and about 135° F., in certain aspects between about 120° F. and about 130° F., and in certain aspects between about 122° F. and about 128° F.

In some aspects, the red meat carcass is dipped in an intervention solution, said intervention solution at an elevated temperature and elevated concentration for a desired period of time to result in at least a 60% bacterial count reduction, in some aspects at least a 70% bacterial count reduction, and in some aspects at least an 80% bacterial count reduction, wherein the desired period of time is in the range of greater than 0 seconds to about 60 seconds, in certain aspects between about 1 second and about 45 seconds, in certain aspects between about 2 seconds and about 30 seconds, in certain aspects between about 3 seconds and about 20 seconds, and in certain aspects between about 4 seconds and about 15 seconds.

In some aspects, the red meat carcass is dipped in an intervention solution, said intervention solution at an elevated temperature and an elevated concentration for a desired period of time, wherein said intervention solution comprises a pH modified peroxyacetic acid solution having a pH between about 7.0 and 9.5, said elevated temperature being between about 115° F. and about 135° F., said elevated concentration being between about 500 ppm and about 750 ppm of said pH modified peroxyacetic acid, and said desired period of time being between about 2 seconds and 10 seconds to result in at least a 60% bacterial count reduction, in some aspects at least a 70% bacterial count reduction, and in some aspects at least an 80% bacterial count reduction.

In some aspects of the present invention, the intervention solution is rinsed off the carcass, parts and/or organs with water after the desired application period of time. In some aspects of the present invention, after the intervention solution is applied, it is not subsequently rinsed off the carcass, parts and/or organs at the processing plant, such that the intervention solution is allowed to be left on the red meat carcass until an immersion chilling stage.

In some aspects, the peroxycarboxylic acid solution is chosen from peroxyformic, peroxypropionic, peroxyacetic, peroxybutanoic, peroxypentanoic, peroxyhexanoic, peroxyheptanoic, peroxyoctanoic, peroxynonanoic, peroxydecanoic, peroxyundecanoic, peroxydodecanoic, peroxylactic, peroxymaleic, peroxyascorbic, peroxyhydroxyacetic, peroxyoxalic, peroxymalonic, peroxysuccinic, peroxyglutaric, peroxyadipic, peroxypimelic, peroxysubric acid, and mixtures thereof.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which:

FIG. 1 is a flow diagram of processing red meat carcasses at slaughter, with the reduction of the bacterial count on a red meat carcass according to certain aspects of the present invention occurring after the evisceration and trimming stages.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION

As illustrated in FIG. 1, the normal processing of red meat animals is initiated by the livestock being killed followed with hide removal (i.e., cattle) or dehairing (i.e., pigs) followed by the eviscerating and trimming stages. After the eviscerating and trimming stages, the red meat carcass, parts and/or organs typically undergo a cooling stage before cutting/deboning and ordinary processing for the resultant meat products. Prior to the chilling stage, the head, feet, and internal organs can be removed from the carcass; and the carcass can be washed and cleaned for microbial (i.e., *E. coli, Listeria, Salmonella*, etc.) and visible concerns.

In the present invention, the inventors have surprisingly discovered that in some embodiments prior to the chilling stage, contacting the red meat carcass with an intervention solution comprising a peroxycarboxylic acid at an elevated temperature and at an elevated concentration for a desired period of time can unexpectedly reduce a bacterial count by as much as 80 percent or more. This reduction of bacterial count prior to the chilling stage is beneficial to the down-line processes in a processing plant, helping to improve quality and minimizing safety concerns relating to microbial contamination of the red meat product. The peroxycarboxylic acid in some embodiments comprises an equilibrium peroxycarboxylic acid while in some other embodiments comprises a pH modified peroxycarboxylic acid.

The intervention solution preferably comprises at least one peroxycarboxylic acid having between 2 and 12 carbon atoms, the peroxycarboxylic acid being chosen from peroxyformic acid, peroxypropionic acid, peroxyacetic acid, peroxybutanoic acid, peroxypentanoic acid, peroxyhexanoic acid, peroxyheptanoic acid, peroxyoctanoic acid, peroxynonanoic acid, peroxydecanoic acid, peroxyundecanoic acid, peroxydodecanoic acid, peroxylactic acid, peroxymaleic acid, peroxyascorbic acid, peroxyhydroxyacetic acid, peroxyoxalic acid, peroxymalonic acid, peroxysuccinic acid, peroxyglutaric acid, peroxyadipic acid, peroxypimelic acid, peroxysubric acid, and mixtures thereof. Preferably, the intervention solution comprises an equilibrium peroxyacetic acid or a pH modified peroxyacetic acid.

The equilibrium peroxyacetic acid preferably has a pH above about 3.0 and below about 7.0, in some aspects about 3.5 to about 5.5, and in some other aspects about 3.5 to about 5.0, although subranges within these ranges are contemplated.

The pH modified peroxycarboxylic acid preferably has a pH above about 7.0 and below about 10.0, in certain aspects a pH range of about 7.0 to about 9.5, and in some other aspects a pH range of about 7.5 to about 9.0, although subranges within these ranges are contemplated. The pH modified peroxycarboxylic acid can be prepared by combining a peroxycarboxylic acid solution, such as a peroxyacetic acid solution, with one or more buffering agents chosen from sodium hydroxide, potassium hydroxide, the sodium salt of carbonic acid, the potassium salt of carbonic acid, phosphoric acid, silicic acid or mixtures thereof, in a quantity that is necessary to bring the solution to said pH range One of ordinary skill in the art will appreciate that other alkalizing chemistries approved for direct food contact may also be used, whether alone or in combination with any of the foregoing buffering agents. The quantity of the buffering agent in a buffered peroxycarboxylic acid solution will generally be in the range of about 0.01% to about 10% by volume of the total solution, but other volumes of the buffering agent may be utilized depending upon various parameters, such as local water condition, including pH, hardness and conductivity.

The elevated temperature of the equilibrium peroxycarboxylic acid or pH modified peroxycarboxylic acid applied to the red meat carcass is between about 100° F. and about 150° F., in certain aspects between about 110° F. and about 140° F., in certain aspects between about 115° F. and about 135° F., in certain aspects between about 120° F. and about 130° F., and in certain aspects between about 122° F. and about 128° F., with other subranges within the foregoing ranges contemplated.

The equilibrium peroxycarboxylic acid or the pH modified peroxycarboxylic acid solution, or buffered peroxycarboxylic acid solution, contains the peroxycarboxylic acid and/or its conjugate salt applied to the red meat carcass in an elevated concentration range between about 10 ppm and about 5000 ppm, in some aspects between about 200 ppm and about 2500 ppm, in some aspects between about 300 ppm and about 1500 ppm, in some aspects between about 350 ppm and about 1000 ppm, and in some other aspects between about 400 ppm and about 750 ppm, with other subranges within the foregoing ranges contemplated.

In certain other aspects of the present invention, the equilibrium peroxycarboxylic acid or the pH modified peroxycarboxylic acid solution comprises peroxyacetic acid in an elevated concentration range between 200 ppm and about 5000 ppm, in some aspects between about 300 ppm and about 2500 ppm, in some aspects between about 350 ppm and about 1500 ppm, in some aspects between about 400 ppm and about 1000 ppm, and in some other aspects between about 500 ppm and about 750 ppm.

The intervention solution after the eviscerating and trimming stages and prior to the chilling stage is applied to the red meat carcass for a desired period of time to result in at least a 60% bacterial count reduction on said red meat carcass, in some aspects at least a 70% bacterial count reduction on said red meat carcass, and in some aspects at least an 80% bacterial count reduction on said red meat carcass. The desired period of time is often in the range of greater than 0 seconds to about 60 seconds, in certain aspects between about 1 second and about 45 seconds, in certain aspects between about 2 seconds and about 30 seconds, in certain aspects between about 3 seconds and about 15 seconds, and in certain aspects between about 4 seconds and about 10 seconds, with other subranges within the foregoing ranges contemplated.

In some aspects, the red meat carcass is soaked, dipped, quenched, rinsed, spraying and/or washed after the eviscerating and trimming stages in an intervention solution comprising an equilibrium peroxycarboxylic acid or a pH modified peroxycarboxylic acid.

After the intervention solution comprising an equilibrium peroxycarboxylic acid or a pH modified peroxycarboxylic acid is applied to the red meat carcass, parts and/or organs, the invention solution can be rinsed off the red meat carcass, parts and/or organs with water. Alternatively, after the intervention solution is applied, it is not subsequently rinsed off the red meat carcass, parts and/or organs prior to the chilling stage, such that the intervention solution is allowed to be left on the red meat carcass, parts and/or organs until a chilling or freezing stage. In some other aspects, the intervention solution is allowed to be maintained on the red meat carcass, parts and/or organs until it naturally degrades into acetic acid and water.

EXAMPLES

As summarized in Table 1 below, eight beef samples were treated with an elevated peroxyacetic acid concentration at an elevated temperature for a specified period of time using either an equilibrium peroxyacetic acid intervention solution or a pH modified peroxyacetic acid intervention solution. The beef samples were treated prior to a chilling stage. The treated beef carcasses were measured for the average bacterial count reduction as a result of the elevated peroxyacetic acid concentration and elevated temperature.

TABLE 1

Antimicrobial efficacy of elevated concentration and temperature application of PAA to beef carcasses.

| Sample No. | PAA Concentration (ppm) | Temperature (° F.) | Exposure Time (seconds) | pH | Average % Reduction |
|---|---|---|---|---|---|
| 1 | 500 | 125 | 7 | ~3 | 89.56 |
| 2 | 500 | 125 | 7 | 7.7 | 93.95 |
| 3 | 500 | 72 | 10 | ~3 | 71.57 |
| 4 | 500 | 72 | 10 | 7.7 | 81.26 |
| 5 | 600 | 125 | 7 | ~3 | 78.51 |
| 6 | 600 | 125 | 7 | 7.7 | 86.16 |
| 7 | 700 | 125 | 7 | ~3 | 88.59 |
| 8 | 700 | 125 | 7 | 7.7 | 95.08 |

As shown in Table 1 above, beef carcasses exposed to both an elevated PAA concentration and temperature for a period of time of at least 7 seconds experienced at least a 70% bacterial count reduction, in some aspects at least an 80% bacterial count reduction, in some aspects at least a 90% bacterial count reduction, and in some other aspects at least a 95% bacterial count reduction. As shown in Sample Nos. 1 and 3 and Sample Nos. 2 and 4 comparing lower temperatures to elevated temperatures at the same concentration, pH and exposure time, beef carcasses exposed to an elevated temperatures exhibit a more produced reduction in bacterial count. This reduction in bacterial count is even more pronounced with both an elevated temperature and pH modified intervention. As compared to 500 ppm equilibrium PAA intervention solution Sample No. 3 at a temperature of 72° F. that had an average reduction count of 71.5%, the 500 ppm pH modified PAA intervention solution Sample No. 2 at an elevated temperature of 125° F. had an average reduction of 93.95%.

As compared to equilibrium PAA intervention solutions (i.e., Samples 1, 3, 5, and 7 at a pH of ~3) at the same concentration, temperature and treatment time, pH modified PAA intervention solutions (i.e., Samples 2, 4, 6 and 8 at pH of about 7.7) provided pronounced results. For example, at the PAA concentration of 500 ppm at an elevated temperature of 125° F. and exposure time of 7 seconds, pH modified PAA intervention solution Sample No. 2 (pH of 7.7) had an average reduction of 93.95% compared to equilibrium PAA intervention solution Sample No. 1 (pH of ~3.3) having an average reduction of 89.56%. As another example, at the PAA concentration of 600 ppm at an elevated temperature of 125° F. and exposure time of 7 seconds, pH modified PAA intervention solution Sample No. 6 (pH of 7.7) had an average reduction of 86.16% compared to equilibrium PAA intervention solution Sample No. 5 (pH of ~3.3) having an average reduction of 78.51%. As yet another example, at the PAA concentration of 700 ppm at an elevated temperature of 125° F. and exposure time of 7 seconds, pH modified PAA intervention solution Sample No. 8 (pH of 7.7) had an average reduction of 95.08% compared to equilibrium PAA intervention solution Sample No. 7 (pH of ~3.3) having an average reduction of 88.59%. Each of these examples illustrates an average reduction difference between the pH modified PAA intervention solution and the equilibrium PAA intervention solution at the same concentration, temperature and exposure time of at least 4%, in some aspects at least 5%, in some aspects at least 6%, in some aspects at least 6.5%, in some aspects at least 7%, and in some aspects at least 7.5%.

These results illustrate the beneficial bacterial count reduction that results from contacting the beef carcass with an intervention solution comprising a peroxycarboxylic acid at an elevated temperature and at an elevated concentration for a desired period of time of less than about 10 seconds. This reduction of bacterial count prior to a chilling stage is beneficial to the down-line processes in a processing plant, helping to improve quality and minimizing safety concerns relating to microbial contamination of the poultry product.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

The invention claimed is:

1. A method for the reduction in microbial activity in a red meat food product intended for human consumption, the method comprising:
contacting said red meat food product after the eviscerating and trimming stages and prior to a chilling or freezing stage with an intervention solution, the intervention solution consisting essentially of a pH modified peroxycarboxylic acid having a pH greater than about 7.0 to about 10.0 at an elevated concentration between about 300 ppm and 2500 ppm and elevated temperature between about 100° F. and about 150° F. for a desired period of time greater than 0 seconds to about 60 seconds.

2. The method of claim 1, wherein said red meat food product is a red meat carcass, red meat parts or a red meat organ.

3. The method of claim 1, said red meat food product is contacted with said intervention solution by soaking, dipping, quenching, rinsing, spraying or washing.

4. The method of claim 1, wherein said peroxycarboxylic acid comprises between about 2 to 12 carbon atoms.

5. The method of claim 1, wherein said peroxycarboxylic acid comprises peroxyacetic acid.

6. The method of claim 1, wherein said elevated concentration of said intervention solution is between about 350 ppm and about 1500 ppm.

7. The method of claim 1, wherein said pH modified peroxycarboxylic acid comprises pH modified peroxyacetic acid.

8. The method of claim 1, wherein said pH modified peroxycarboxylic acid is prepared using at least one buffering agent, said at least one buffering agent chosen from sodium hydroxide, potassium hydroxide, sodium salts of carbonic acid, potassium salts of carbonic acid, phosphoric acid, silicic acid and combinations thereof.

9. The method of claim 1, wherein said elevated temperature is between about 115° F. and about 135° F.

10. The method of claim 1, wherein said intervention solution is applied to said red meat food product for said desired period of time to result in at least a 60% bacterial count reduction.

11. The method of claim 10, wherein said desired period of time of the intervention solution applied to said red meat food product is in the range between about 2 seconds and about 30.

12. The method of claim 1, wherein said intervention solution is rinsed off the red meat food product after the desired period of time.

13. The method of claim 1, wherein said peroxycarboxylic acid solution is chosen from peroxyformic, peroxypropionic, peroxyacetic, peroxybutanoic, peroxypentanoic, peroxyhexanoic, peroxyheptanoic, peroxyoctanoic, peroxynonanoic, peroxydecanoic, peroxyundecanoic, peroxydodecanoic, peroxylactic, peroxymaleic, peroxyascorbic, peroxyhydroxyacetic, peroxyoxalic, peroxymalonic, peroxysuccinic, peroxyglutaric, peroxyadipic, peroxypimelic, peroxysubric acid, and mixtures thereof.

14. The method of claim 1, wherein said intervention solution is an equilibrium peroxycarboxylic acid having a pH between about 3.5 and about 6.0.

15. The method of claim 14, wherein said equilibrium peroxycarboxylic acid comprises an equilibrium peroxyacetic acid.

16. The method of claim 1, wherein said red meat food product is contacted with said intervention solution after a cooling stage and prior to a cutting or deboning stage.

17. The method of claim 1, wherein said red meat food product is contacted with said intervention solution after a cooling stage, a cutting and a deboning stage but prior to a meat processing stage chosen from grinding, curing, pickling, smoking, cooking and canning.

18. A method for the reduction in microbial activity in a red meat food product intended for human consumption, the method comprising:
contacting said red meat food product after the eviscerating and trimming stages and prior to a chilling or freezing stage with an intervention solution consisting essentially of a pH modified peracetic acid solution having a pH greater than about 7.0 to about 9.5 at a temperature being between about 115° F. and about 135° F. and a concentration being between about 500 ppm and about 750 ppm for a desired period of time being between about 2 seconds and 10 seconds to result in at least a 70% bacterial count reduction.

* * * * *